C. E. COLEGROVE.
BALL RETAINER.
APPLICATION FILED JAN. 2, 1909.

1,036,569.

Patented Aug. 27, 1912.

Witnesses.
E. B. Gilchrist
H. R. Sullivan

Inventor
Charles E. Colegrove
by
Attorneys.

UNITED STATES PATENT OFFICE.

CHARLES E. COLEGROVE, OF EAST CLEVELAND, OHIO, ASSIGNOR TO THE WHITE SEWING MACHINE COMPANY, OF CLEVELAND, OHIO, A CORPORATION OF OHIO.

BALL-RETAINER.

1,036,569.  Specification of Letters Patent. Patented Aug. 27, 1912.

Application filed January 2, 1909. Serial No. 470,388.

*To all whom it may concern:*

Be it known that I, CHARLES E. COLEGROVE, a citizen of the United States, residing at East Cleveland, in the county of Cuyahoga and State of Ohio, have invented a certain new and useful Improvement in Ball-Retainers, of which the following is a full, clear, and exact description.

The present invention is directed to a ball retainer for anti-friction bearings.

The invention more particularly relates to a retainer of that class used for preventing the balls from contacting with each other and which themselves move with the balls as the latter move in their races.

The object of the invention has been to provide a retainer of such construction that it may be used in certain locations where it has not been possible to employ ball retainers heretofore, as for example, in the three point contact system made up of double cones and an inclosing raceway.

It has been my purpose to provide a ball retainer of this character which may be easily constructed and into which the balls may be readily assembled.

The above objects and other useful advantages it will be seen are attained by that embodiment of my invention described in the following specification with reference to the accompanying drawings, in which—

Figure 1:
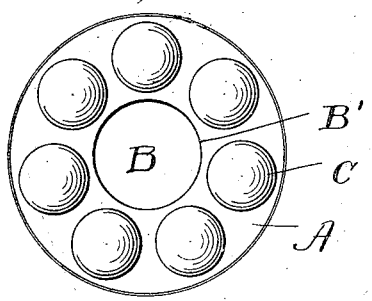
Figure 2:
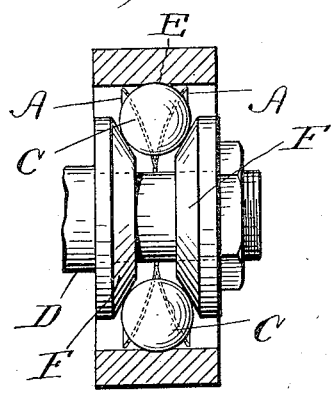
Figure 3:
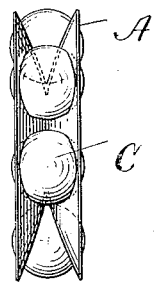
Figure 4:
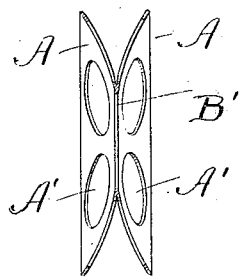

Figure 1 is a side elevation of a retainer with the balls therein. Fig. 2 is a transverse section through a ball retainer held between a double cone and an inclosing raceway. Fig. 3 is an edge elevation of the retainer with the balls therein. Fig. 4 is a transverse section through the retainer with the balls removed.

As shown in the drawings, the retainer is made of a pair of frusto-conical rings A, A, each with a central opening B therein, the rings being secured together at the periphery B' of this central opening. The rings need not be true cones, and, in fact, it is preferred to have them of spherical curvature. Each of the rings is perforated as at A', the perforations in each ring lying opposite to the perforations in the other. Balls C are held between the two rings so as to project beyond the exposed surface of the rings on each side. The dimensions and locations of the holes are also such with relation to the balls that the latter when in use project beyond a line drawn between the outer peripheries of the two rings. By this arrangement it is possible to pass a supporting spindle D through the central opening B and adjust a pair of cones F, F to the balls on each side of the retaining rings while the balls simultaneously fit against a peripheral race E. This is an arrangement of raceway which it is frequently desired to have and one for which my retainer is especially suitable.

Having thus described my invention, I claim:

A ball retainer comprising a pair of substantially frusto-conical rings having coincident central openings, the rings contacting and secured together at the edges of said openings and diverging as they recede outwardly therefrom, serial openings oppositely disposed in said rings and balls of greater diameter than the serial openings in which they are seated, the surfaces of the balls projecting laterally through the openings and adapted to be engaged by opposed bearing surfaces upon opposite sides of the rings, and projecting radially beyond the peripheries of the rings and adapted to engage an annular ball race, substantially as specified.

In testimony whereof, I hereunto affix my signature in the presence of two witnesses.

CHARLES E. COLEGROVE.

Witnesses:
 J. M. WOODWARD,
 H. R. SULLIVAN.

Copies of this patent may be obtained for five cents each, by addressing the "Commissioner of Patents, Washington, D. C."